United States Patent [19]

McCoolidge

[11] Patent Number: 5,689,983
[45] Date of Patent: Nov. 25, 1997

[54] IGNITION RACK AND SECTOR GEAR FOR A STEERING COLUMN

[75] Inventor: James S. McCoolidge, Omaha, Nebr.

[73] Assignee: Omaha Auto Safety, Inc., Omaha, Nebr.

[21] Appl. No.: 743,921

[22] Filed: Nov. 5, 1996

Related U.S. Application Data

[63] Continuation of Ser. No. 398,365, Mar. 3, 1995, abandoned, which is a continuation-in-part of Ser. No. 350,233, Dec. 6, 1994, abandoned, which is a continuation-in-part of Ser. No. 301,348, Sep. 6, 1994, abandoned.

[51] Int. Cl.$^6$ .................................................. B60R 25/02
[52] U.S. Cl. .......................... 70/252; 70/186; 74/109
[58] Field of Search ........................ 70/182–186, 252, 70/245–251, 416–418, 190, 191; 74/109; 292/142, DIG. 38

[56] References Cited

U.S. PATENT DOCUMENTS

| | | | |
|---|---|---|---|
| 379,499 | 3/1888 | Andrews | 74/109 |
| 1,446,589 | 2/1923 | Shaw | 70/417 |
| 1,714,150 | 5/1929 | Whitehouse | 70/417 |
| 2,290,727 | 7/1942 | Best | 70/417 |
| 2,868,007 | 1/1959 | Neiman e al. | 70/252 |
| 3,490,255 | 1/1970 | Wight et al. | 70/252 |
| 3,572,067 | 3/1971 | Kimberlin et al. | 70/252 |
| 3,596,483 | 8/1971 | Elliot | 70/186 |
| 3,638,462 | 2/1972 | White et al. | 70/186 |
| 3,648,490 | 3/1972 | Kimberlin et al. | 70/186 |
| 3,703,092 | 11/1972 | Elliot | 70/248 |
| 3,791,182 | 2/1974 | Oxley et al. | 70/252 |
| 3,919,868 | 11/1975 | Lipschutz | 70/239 |
| 4,029,168 | 6/1977 | Kramer | 180/114 |
| 4,936,408 | 6/1990 | Melo | 180/287 |
| 5,036,686 | 8/1991 | Ichinose | 70/186 |
| 5,172,576 | 12/1992 | Milton | 70/252 X |
| 5,265,487 | 11/1993 | Williams et al. | 74/422 |

FOREIGN PATENT DOCUMENTS

| | | | |
|---|---|---|---|
| 677169 | 7/1966 | Belgium | 70/252 |
| 1451316 | 7/1966 | France | 70/252 |
| 3611483 | 9/1987 | Germany | 70/252 |
| 369040 | 6/1963 | Switzerland | 292/DIG. 38 |
| WO83/04228 | 12/1983 | WIPO | 70/186 |

*Primary Examiner*—Lloyd A. Gall
*Attorney, Agent, or Firm*—Westman, Champlin & Kelly, P.A.; S. Koehler

[57] ABSTRACT

An improved ignition rack and an improved sector gear for a steering column in a vehicle inhibits theft of the vehicle. The ignition rack is used to operate an electrical switch mounted in the vehicle. The vehicle has a key receiving assembly rotatably mounted in the steering column and a shaft with a first end joined to the key receiving assembly for rotation therewith. A second end of the shaft is joined to the sector gear, the sector gear having teeth located on a portion of an outer perimeter. In a first embodiment, the ignition rack includes a guard flange for inhibiting removal of the sector gear from the shaft. The sector gear also includes a guard flange that forms a recess which opens to a surface opposite the guard flange of the ignition rack. The sector gear with the guard flange formed thereon protect a spring connected to the sector gear and a locking bolt from attack.

24 Claims, 9 Drawing Sheets

IGNITION RACK AND SECTOR GEAR FOR A STEERING COLUMN

CROSS REFERENCE TO RELATED APPLICATION

This application is a continuation of application Ser. No. 08/398,365 filed on Mar. 3, 1995, now abandoned, which is a continuation-in-part of application Ser. No. 08/350,233 filed on Dec. 6, 1994, now abandoned, which is a continuation-in-part of application Ser. No. 08/301,348, filed on Sep. 6, 1994, now abandoned.

BACKGROUND OF THE INVENTION

The present invention relates to preventing a thief from stealing an automobile. In particular, an embodiment of the present invention provides an improved ignition rack and an improved sector gear that makes disablement of a steering wheel lock mechanism and a gearshift mechanism substantially more difficult.

Motor vehicle theft is an ever increasing problem in the United States of America and throughout the world. As a means for deterring theft, automotive engineers have long appreciated the desirability of locking the steering wheel of the vehicle and preventing it from being turned when the vehicle is parked. Some manufacturers locate a key receiving assembly on the right side of the column. The key receiving assembly is joined to a shaft which is rotated when a proper key is inserted into the key receiving assembly. A sector gear located on the left side of the column is joined to the shaft to turn therewith. When the key is turned, the sector gear rotates and has teeth that mesh with an ignition rack. Rotation of the sector gear longitudinally displaces the ignition rack to operate an electrical control switch to start and allow the motor in the vehicle to run. In addition, rotation of the sector gear unlocks the steering wheel from the steering column by disengaging a locking bolt located therein.

About as long as locked steering wheels have been used in automobiles, thieves have devised ways to circumvent the above-described locking mechanism. One common technique used by thieves is to break through the outer casing of the steering column on the left side, which allows access to the ignition rack and sector gear. By breaking the ignition rack and/or removing the sector gear, the thief can unlock the steering wheel and the gearshift mechanism and start the motor without using the key.

With millions of automobiles in service and susceptible to the theft technique described above, there is an immediate need to deter use of this technique.

SUMMARY OF THE INVENTION

An improved ignition rack for a steering column in a vehicle deters theft of the vehicle. The ignition rack is used to operate an electrical switch mounted in the vehicle. The vehicle has a key receiving assembly rotatably mounted in the steering column and a shaft with a first end joined to the key receiving assembly for rotation therewith. A second end of the shaft is joined to a sector gear. The sector gear has teeth located on a portion of an outer perimeter which are used to displace the ignition rack in order to operate the electrical switch. The sector gear is also commonly used to control displacement of a locking bolt which selectively locks the steering wheel and prevents rotation. Unlike the ignition racks of the prior art which are designed just to operate the ignition switch, the ignition rack of the present invention is designed to inhibit removal of the sector gear.

In a first embodiment, the ignition rack includes a longitudinal member having teeth for meshing with the teeth of a sector gear. Proximate the teeth is an extending flange joined to the longitudinal member. The extending flange inhibits removal of the sector gear from the shaft.

In a second embodiment, the ignition rack is formed with an inner reinforcing core cast within an outer member. The outer member includes the teeth that mesh with the teeth of the sector gear. The inner core reinforces the rack in order that the rack easily resists forces generated from hand tools used by auto thieves.

In a third embodiment, the ignition rack has an enlarged head portion with an arcuate channel formed therein. The channel opens to a side of the rack that is substantially planar or flat. A curved surface is provided on a side opposite the substantially flat side. The curved surface resists breaking since it does not have an edge that can be used to impart a force on the ignition rack.

In a further embodiment, the present invention is a kit used to retrofit existing steering columns. The kit includes an improved ignition rack as described above and an improved sector gear. The sector gear is securable to an end of the shaft remote from the first end. The sector gear has a guard flange that forms a recess for an end of the locking bolt and teeth located on a portion of an outer perimeter that mesh with teeth of the ignition rack.

In a further embodiment, a sector gear is joined to a shaft prior to installation in the steering column. Preferably, the sector gear is made integral with the shaft to provide a unitary assembly having a sector gear portion and a shaft portion. The shaft portion is inserted in an aperture on the left side of the inner structure of the steering column. The shaft portion extends through an opening on the right side of the inner structure. A suitable fastener is joined to a remote end of the shaft portion opposite the sector gear portion to prevent withdrawal of the shaft portion back through the aperture. In the preferred embodiment, an annular groove is located on the remote end of the shaft portion. The annular groove accepts a snap ring having a diameter greater than the opening. The remote end of the shaft has a known configuration so as to couple to the key receiving assembly positioned on the right side of the steering column. When assembled, the snap ring is protected by the key receiving assembly.

Commonly, the sector gear of the prior art is fastened to the shaft of the prior art after the shaft has been located in the aperture of the inner structure, having been inserted from the key receiving assembly side to the sector gear side. On some steering columns of the prior art, a snap ring is used to secure the sector gear to the shaft. However as stated above, a common technique of thieves is to remove the sector gear from the shaft. By making the sector gear and the shaft as a single piece and securing this assembly to the inner structure of the steering column using a fastener on the remote end of the shaft adjacent the key receiving assembly, it is very difficult to remove the sector gear.

DETAILED DESCRIPTION OF THE PREFERRED EMBODIMENTS

Figure 1:
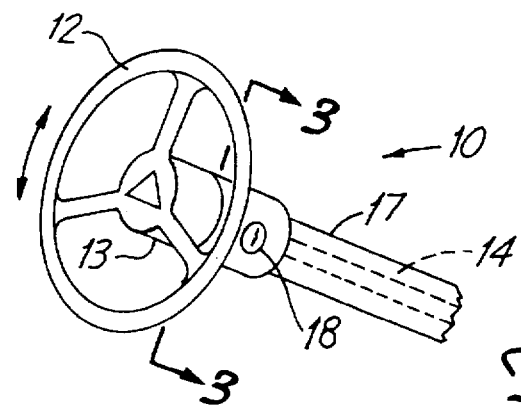
FIG. 1 is a perspective view of a known tilt steering column for a vehicle.
Figure 2:
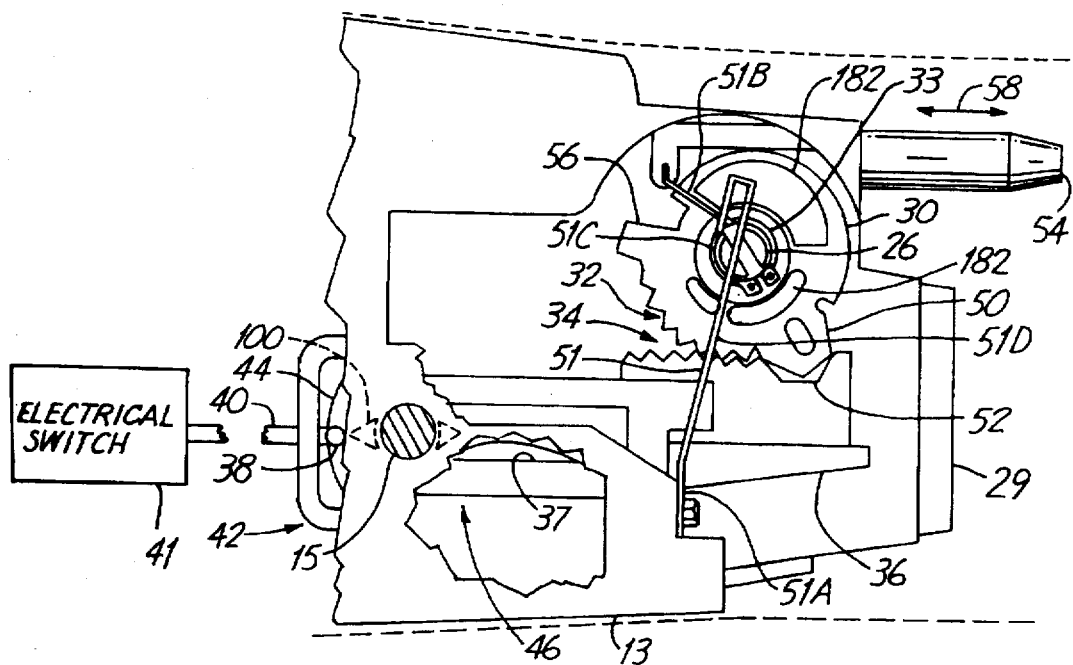
FIG. 2 is a side elevational view of a portion of the known tilt steering column.

A tilt steering column of the prior art is illustrated at 10 in FIG. 1 and includes a steering wheel 12 connected to a steering shaft 14. The steering column 10 is mounted within a vehicle to control pivotal movement of wheel assemblies connected thereto. Referring also to FIG. 2, as is known, the steering column 10 allows the steering wheel 12 to pivot or tilt to selected angular positions by allowing an upper column portion 13 to pivot on a pivot pin 15 relative to a stationary column portion 17.

Figure 3:
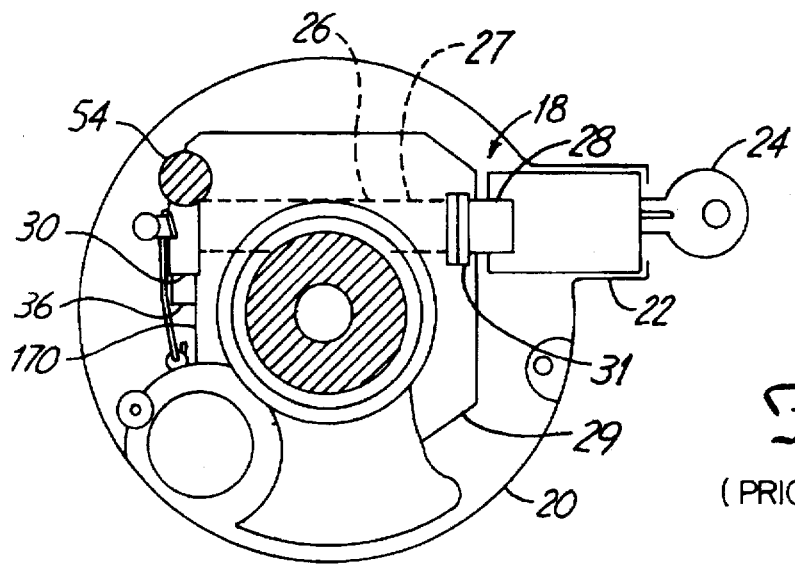
FIG. 3 is a schematic sectional view of the steering column of FIG. 1 taken along lines 3—3.

The steering column 10 includes a key receiving assembly indicated at 18 in FIG. 3. The key receiving assembly 18 initiates starting of the vehicle and controls the operating state of the vehicle as determined by an operator. Specifically, when the key receiving assembly 18 is placed in a predetermined position, the steering wheel 12 is locked and unable to rotate with the hope of deterring theft of the vehicle.

Referring to FIGS. 2 and 3, the steering column 10 includes an outer casing 20 that includes a portion 22 integrally formed with the outer casing 20 on one side of the steering column 10 for supporting and protecting the key receiving assembly 18. The key receiving assembly 18 receives a key 24 for starting the vehicle. The key 24 is adapted to engage the key receiving assembly 18, and if the key 24 matches tumblers within the key receiving assembly 18, the key 24 will rotate a shaft 26 when the key 24 is rotated.

On an end opposite the key receiving assembly 18, a sector gear 30 is mounted to the shaft 26. During assembly, the shaft 26 is inserted through an aperture 27 of an inner structure 29 from the key receiving assembly 18 toward the sector gear 30. The shaft 26 has a suitable end 28 that couples to the key receiving assembly 18 and an annular flange 31, which limits insertion in the inner structure 29. On some steering columns of the prior art, a snap ring 33 joins the sector gear 30 to the shaft 26. However, a common practice is to simply push the sector gear 30 on the shaft 26 to obtain a press fit, which would allow removal at a later date.

The sector gear 30 has teeth 32 which are adapted to mesh with corresponding teeth 34 of a known ignition rack 36. The ignition rack 36 has a slot 37 that allows the ignition rack to slide relative to the pin 15. On an end opposite the teeth 34, the ignition rack 36 has an enlarged head portion 42 formed with an arcuate slot 44. The arcuate slot 44 receives a pin 38 from an elongated switch rod 40, which couples the ignition rack 36 to a conventional electrical starter switch 41. The ignition rack 36 has a slide portion 46 allowing longitudinal displacement. When the key 24 is rotated, the sector gear 30 rotates, which in turn, displaces the ignition rack 36 through meshing of the teeth 32 and 34. Displacement of the ignition rack 36 pulls the switch rod 40 to initiate starting of the vehicle motor.

Figure 9:
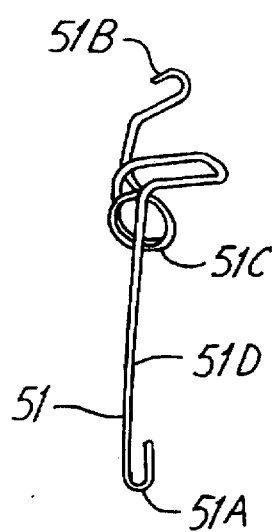
FIG. 9 is a perspective view of a spring usable with the ignition rack of FIG. 4.

As stated above, the steering wheel 12 can be locked with the intent, hopefully, of preventing theft of the vehicle. As illustrated in FIG. 2, the sector gear 30 has a depending finger 50 which fits in a corresponding recess 52 formed in the ignition rack 36. A wire spring 51 has one end 51A screwed to upper column portion 13 with an opposite end 51B connected to a locking bolt 54. The spring 51 is also illustrated in FIG. 9. An intermediate portion 51C is joined to the shaft 26, and with a shoulder 56, controls longitudinal movement of the locking bolt 54 in directions indicated by double arrow 58. With counter clockwise rotation of the key 24, the locking bolt 54 is displaced toward the steering wheel 12 and engages a slot formed in a locking plate, not shown, or at least a lower surface of the locking plate. If the locking bolt 54 does not engage a slot, slight rotation of the steering wheel 12 will allow the locking bolt 54 to project through the slot.

Although the steering column 10 locates the key receiving assembly 18 in a position quite convenient for starting the automobile, the steering column 10 is also susceptible to acts that allow a thief to steal the vehicle in spite of the presence of the locking bolt 54. Specifically, in some circumstances, the outer casing 20 is broken to allow access to the ignition rack 36 and/or sector gear 30. By breaking the ignition rack 36, which is normally formed of a light-weight diecast metal, and/or prying the sector gear 30 off of the shaft 26, a thief can cause the locking bolt 54 to be displaced downwardly away from the locking plate to unlock the steering wheel 12 and allow gearshifting as well as start the vehicle by pulling on the switch rod 40.

FIGS. 4-8 illustrate a first embodiment of an improved ignition rack of the present invention at 60. Generally, the ignition rack 60 is formed of a material that will not break in the presence of forces generated from hand tools such as screwdrivers or the like used commonly by auto thieves. In one embodiment, the ignition rack 60 includes an inner hardened core structure 62 that is preferably encased within a castable material 64 to increase the breaking threshold of the ignition rack 60 above that of known unitary body ignition racks. The ignition rack 60 is substantially similar to the known ignition rack 36 described above. The ignition rack 60 includes an enlarged head portion 61, a front portion 63 and a central slide portion 65 located therebetween. A support 67 is preferably integrally formed with or otherwise fastened to the front portion 63. The castable material 64 allows easy formation of teeth 68 and an enlarged recess 69 on the support 67 to cooperate with the sector gear 30 when installed. A slot 66 is provided in the central slide portion 65 of sufficient width to accommodate the pivot pin 15. Suitable materials for the structure 62 include mild carbon steel, while the outer castable material 64 is preferably formed of silicon brass. This combination of materials yields a nearly unbreakable assembly when subjected to forces generated from hand tools such as screwdrivers and the like.

As illustrated, the inner core structure 62 preferably includes two longitudinal members 70 on either side of slot 66. An end member 74 joins the longitudinal members 70 at a first end, while an extending flange 75, discussed below, joins the longitudinal members 70 at an end opposite end member 74. It should be understood that ignition rack 60 could be formed of a solid piece of silicon brass since this material by itself is very difficult to break.

Preferably, the ignition rack 60 includes identification means for allowing a thief to easily recognize that the ignition rack 60 is present in the steering column 10. The silicon brass provides a visual indication to the thief that has broken the outer casing 20 of the steering column 10. Specifically, the silicon brass gives the ignition rack 60 a bright gold color which easily identifies the ignition rack 60 of the present invention as opposed to the diecast ignition rack 36 which has a dull gray metallic finish. If desired, the ignition rack could be painted or anodized a noticeable color, particularly if some other suitable strong material is used in place of the silicon brass. Use of a visual identifier allows a thief to identify the improved ignition rack 60 of the present invention and hopefully abandon theft of the vehicle.

In the embodiment illustrated, the ignition rack 60 also includes an extending guard flange 78 that projects above the teeth 68 in order to inhibit removal of the sector gear 30 from the shaft 26. The guard flange 78 does not interfere with meshing operation of the sector gear 30 and the ignition rack 60. As illustrated, the guard flange 78 extends from a planar surface 80 of the ignition rack 60 along an arcuate path to form a curved outer surface 82. The guard flange 78 has a substantially flat planar surface 83 facing the sector gear 30. Along with the guard flange 78, it has been found that gluing the sector gear 30 to the shaft 26 in addition to using the conventional fastening technique makes the sector gear 30 very difficult to remove from the shaft 26. A suitable spring similar to spring 51 is formed with bends in a portion 51D, if necessary, to accommodate the guard flange 78.

Preferably, the guard flange 78 is of sufficient length or height and disposed on the ignition rack 60 so as to interfere with tilt capability of the tilt steering column 10 when the key receiving assembly 18 has been placed in a "locked" position. The inability to tilt the steering column 10 when the vehicle is turned off and in a locked position also serves to communicate to the thief that the improved ignition rack 60 of the present invention is within the steering column 10. As illustrated, the structure 62 preferably includes the extending flange 75, which is also made of mild carbon steel. The extending flange 75 also projects above the teeth 68 so as to reinforce the guard flange 78. Of course, the guard flange 78 need not be a single unitary structure in that other forms could also be used. For instance, other embodiments could include a series of posts extending above the teeth 68, each post being of sufficient strength to resist breakage.

An additional feature to prevent a thief from using a screwdriver or the like to break apart the ignition rack 60 of the present invention is a curved outer surface 90 to form the solid head portion 61. As appreciated by those skilled in the art, the head portion 61 blocks rotation of the gearshift mechanism of the steering column 10 when the ignition rack 60 is in a position corresponding to the steering wheel 12 being locked and the ignition off. Since the prior art ignition racks can be broken, the head portion 42 will no longer block movement of the gearshift mechanism. By making the ignition rack 60 suitably strong throughout and including the head portion 61, the head portion 61 remains in position to block movement of the gearshift mechanism. The curved outer surface 90 generally faces away from the steering shaft 14. It should be noted that the ignition rack 60 of the present invention in its preferred embodiment uses an arcuate channel 92 formed in a flat surface 93 rather than a slot 44, as described above with respect to ignition rack 36, which further prevents breaking of the ignition rack 60 through the use of screwdrivers or the like. If installed in an existing steering column 10, a pivot boss 100 (FIG. 2) for pivot pin 15 commonly used and fastened to an inner surface of the upper column portion 13 must be removed so as not to interfere or engage with the outer curved surface 90 of the improved ignition rack 60.

FIGS. 10-13 illustrate a second embodiment of an ignition rack of the present invention at 120 and an improved sector gear of the present invention at 122. Referring first to the ignition rack 120, it includes an enlarged head portion 124, a front portion 126 and a central slide portion 128 located therebetween. A support 130 is joined to the front portion 126 and has suitable teeth 132 for meshing with the sector gear 122. A guard flange 134 extends from a planar surface 136 of the front portion 126 above the teeth 132. When installed in the steering column 10, the guard flange 134 inhibits removal of the sector gear 122 from the shaft 26.

Figure 4:
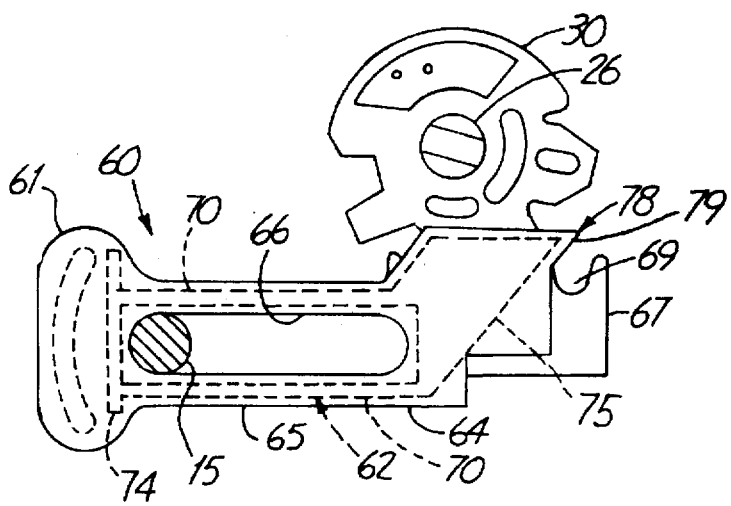
FIG. 4 is a front elevational view of a prior art sector gear and a first embodiment of an improved ignition rack of the present invention.
Figure 5:
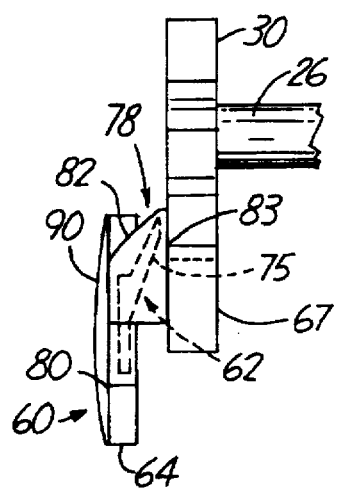
FIG. 5 is a side elevational view of the prior art sector gear and the ignition rack of FIG. 4.
Figure 6:
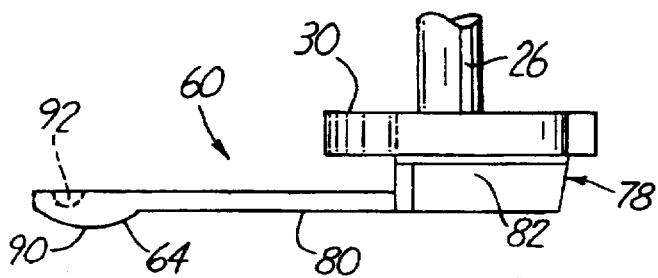
FIG. 6 is a top plan view of the prior art sector gear and the ignition rack of FIG. 4.
Figure 4A:
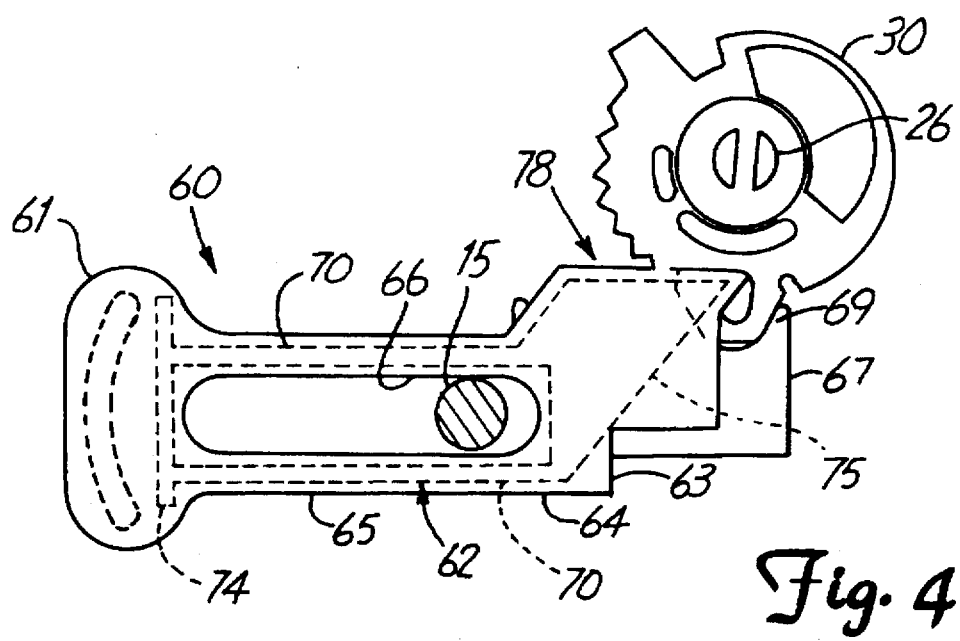
FIG. 4A is a front elevational view of the sector gear and the improved ignition rack of the present invention in a position where the steering wheel is locked.
Figure 7:
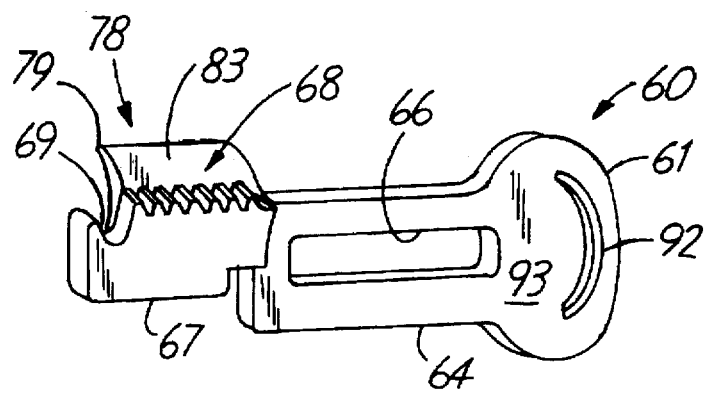
FIG. 7 is a perspective view of the ignition rack of FIG. 4.
Figure 8:
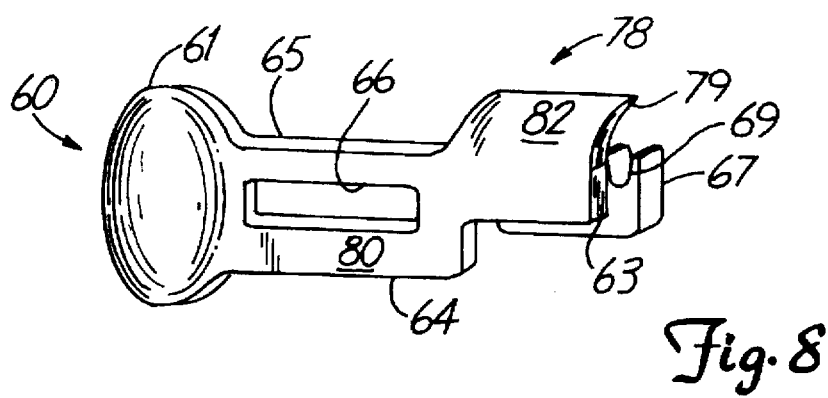
FIG. 8 is a perspective view from an opposite side of the ignition rack of FIG. 4.
Figure 10:
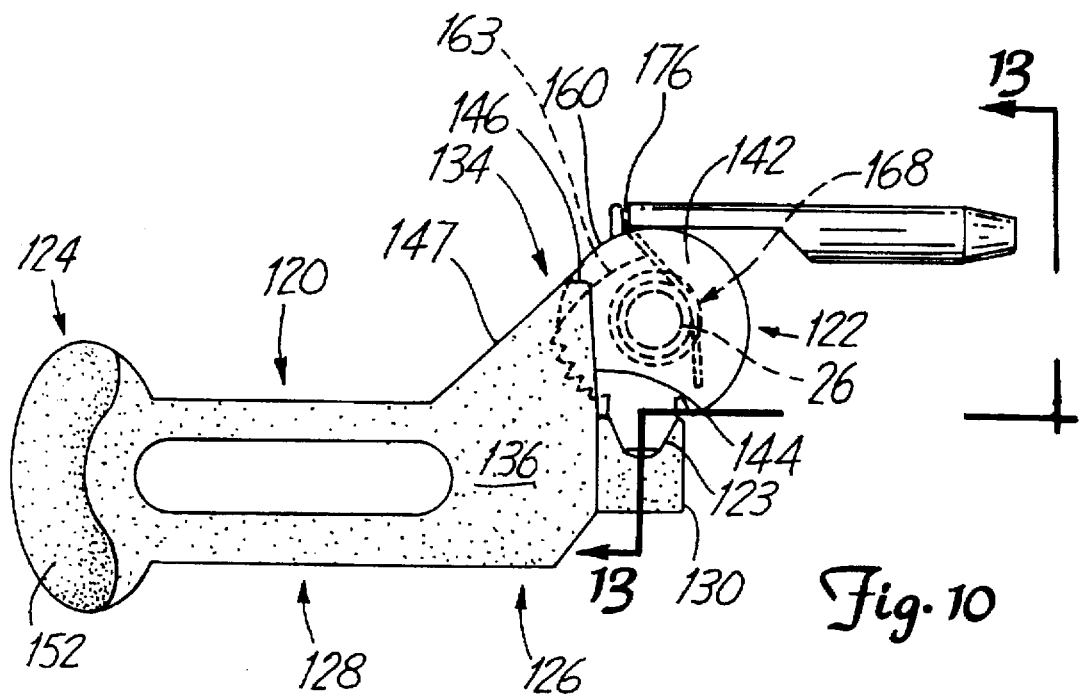
FIG. 10 is a side elevational view of a second embodiment of an ignition rack of the present invention, a sector gear of the present invention and a locking bolt.
Figure 11:
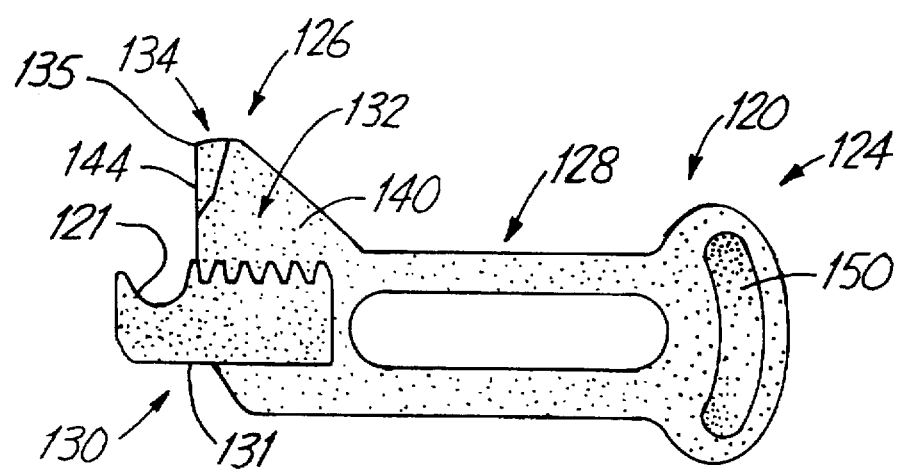
FIG. 11 is a side elevational view of the second embodiment of the ignition rack from a side opposite the view of FIG. 10.

FIG. 10 illustrates the orientation of the sector gear 122 when the ignition is off and the steering wheel 12 is locked. As with the conventional sector gear 30, the sector gear 122 has a depending finger 123 located in an enlarged recess 121 of the ignition rack 120. The guard flange 134 has a substantially flat planar surface 140 facing the sector gear 122 and is of sufficient height or length to overlap at least a portion of a front surface 142 of the sector gear 122 when the sector gear 122 is in this position. This overlap prevents removal of the sector gear 122 from the shaft 26. The previous embodiment described above also provides overlap between the guard flange 78 and the sector gear 30 when the ignition is off and the steering wheel 12 is locked. Referring to FIG. 4, it is shown that the guard flange 78 has a front portion 79 that is located above the recess 69.

Figure 13:
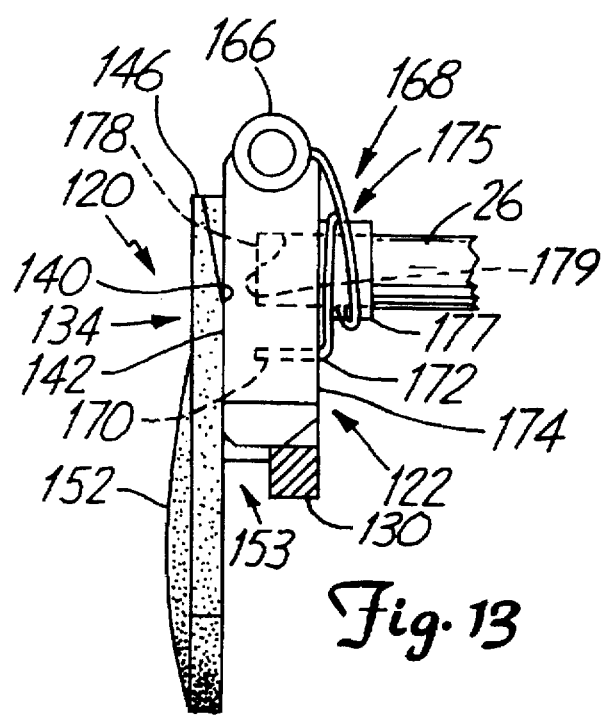
FIG. 13 is a sectional view of FIG. 10 taken along lines 13—13.
Figure 16:
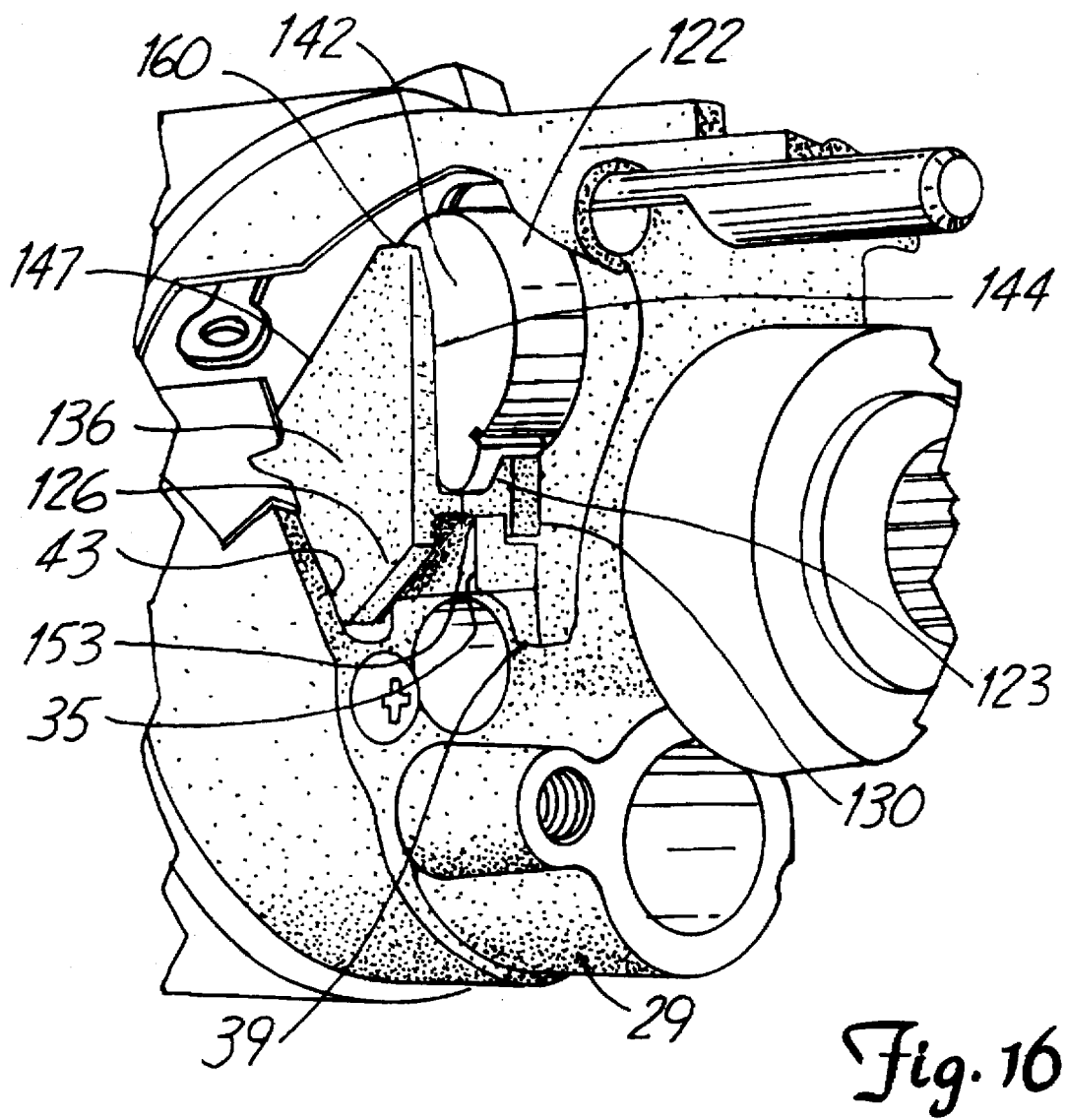
FIG. 16 is a perspective view of the ignition rack of the second embodiment and the sector gear of the present invention installed in a steering column.

Referring back to FIG. 10, the guard flange 134 has a straight front edge 144 that joins to form an apex 146 with an inclined rear edge 147. Depending on the height of the guard flange 134, a small tapered surface 135 may be needed so as to provide clearance for the guard flange 134 when the ignition rack 120 is displaced forwardly during engine starting. Preferably, the angle of inclination of the rear edge 147 is chosen so as to inhibit tilt operation of the steering column 10 to indicate to a thief that the ignition rack 120 of the present invention is present. As illustrated in FIG. 13, the front support 130 is joined to the central portion 128 to provide a channel 153. The channel 153 accepts a flange portion 35 (FIGS. 14 and 16) of the inner structure 29 so that the front support 130 slides in a groove 39 like the prior art ignition rack 36. A bottom edge 131 of the support 130 is made straight and is of sufficient length in order that the flange portion 35 is retained in the channel 153 particularly when the ignition rack 120 and the sector gear 122 are as illustrated in FIGS. 10 and 16. In addition, the front portion 126 of the ignition rack 120 has been extended forwardly as compared to the ignition racks of the prior art. By extending the front portion 126 forwardly on the ignition rack 120, the front portion 126 is located in a notch 43 formed in the inner structure 29 when the ignition rack 120 and the sector gear 122 are in a position corresponding to the steering wheel 12 being locked and the ignition off. In this position, the ignition rack 120 is further prevented from being pryed away from the sector gear 122 since the front portion 126 contacts the inner structure 29.

Figure 15:
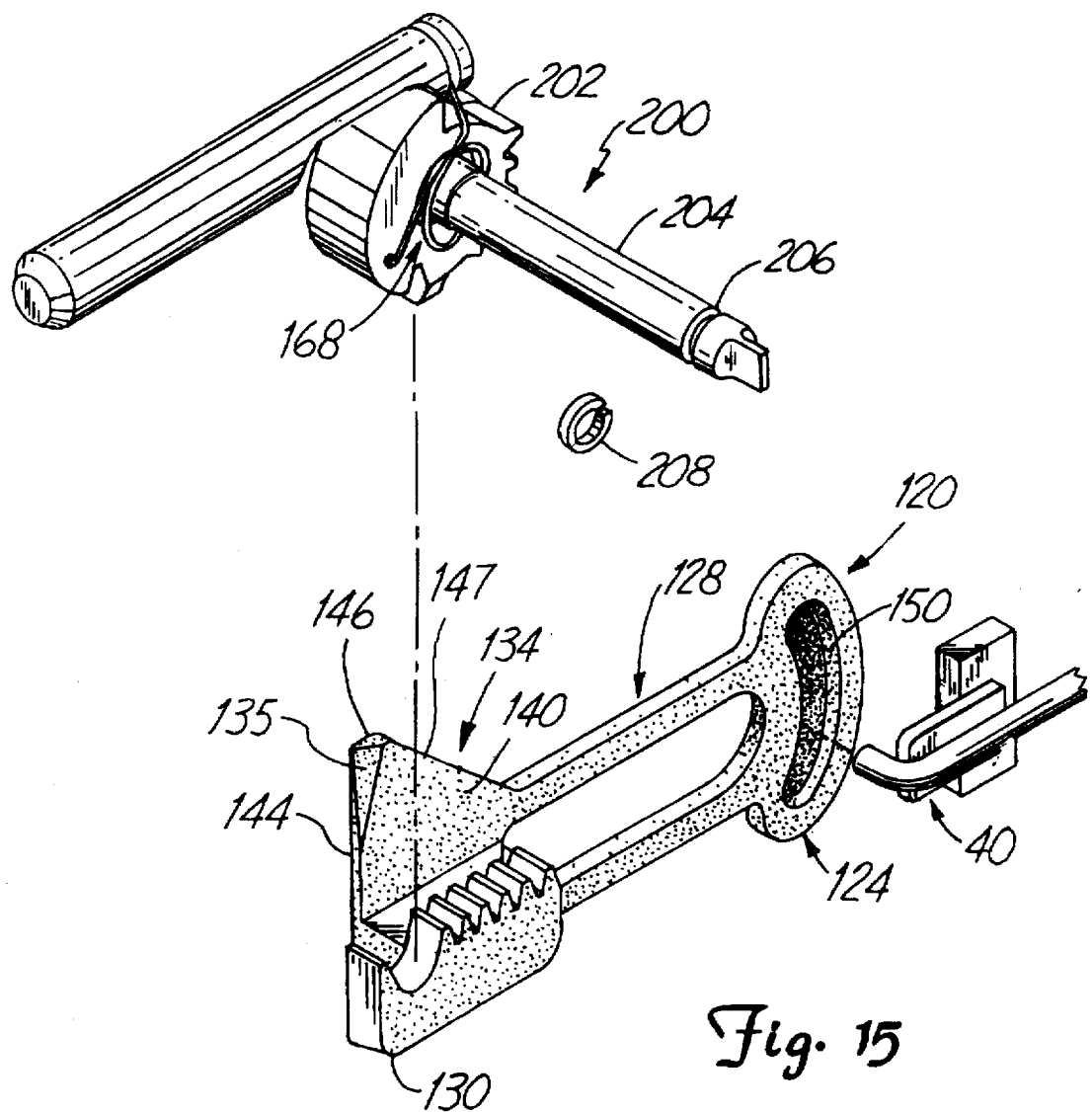
FIG. 15 is a perspective view of the sector gear/shaft assembly and the ignition rack of the second embodiment.

Like the ignition rack 60, the ignition rack 120 preferably includes an arcuate channel 150 formed in the head portion 124 to accept the ignition rod 40 (FIG. 15). A curved outer surface 152 on a side opposite the channel 150 prevents breaking of the ignition rack 120 through the use of screwdrivers or the like. The ignition rack 120 is formed from a suitably strong material such as silicon brass and can also include a hardened inner core, if desired.

Figure 12:
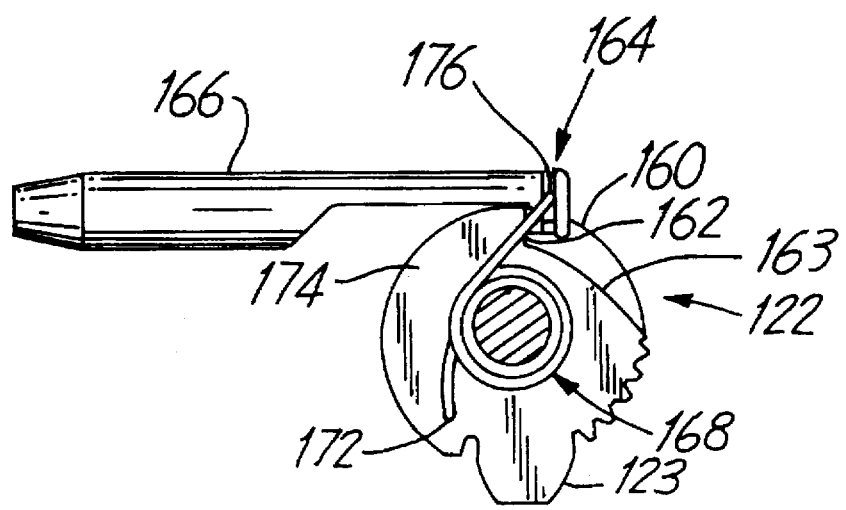
FIG. 12 is a side elevational view of the sector gear of the present invention and the locking bolt from a side opposite the view of FIG. 10.

The improved sector gear 122 also inhibits theft of the automobile. As illustrated in FIGS. 10 and 12, the sector gear 122 includes a guard flange 160 that with a shoulder 162 form a recess 163 suitable for receiving an end 164 of a locking bolt 166. A spring 168 is located between the sector gear 122 and the inner structure 29 of the steering column 10 (FIG. 3). As illustrated in FIG. 10, the sector gear 122 with the guard flange 160 protects the spring 168 so that it can not be reached by the thief. In the embodiment illustrated, the spring 168 is a wire spring having a first end 170 that is inserted in an aperture 172 on a side 174 opposite the ignition rack 120. The spring 168 includes a loop 175 that extends around the shaft 26 and a second end 176 that is suitably joined to the end 164 of the locking bolt 166. In the preferred embodiment, the shaft 26 is inserted through a support shoulder 177 and glued in an aperture 178 bounded by an endwall 179 of the sector gear 122. In this manner, the sector gear 122 is formed to have the flat outer surface 142 facing the surface 140 of the guard flange 134. By eliminating the recesses 182 found on the sector gear 30 of the prior art (FIG. 2), the sector gear 122 resists attack and breaking by not providing an edge of a recess that can be used to impart a force on the sector gear 122. The sector gear 122 is made of a suitably strong material such as plastic, silicon brass or stainless steel.

Figure 14:
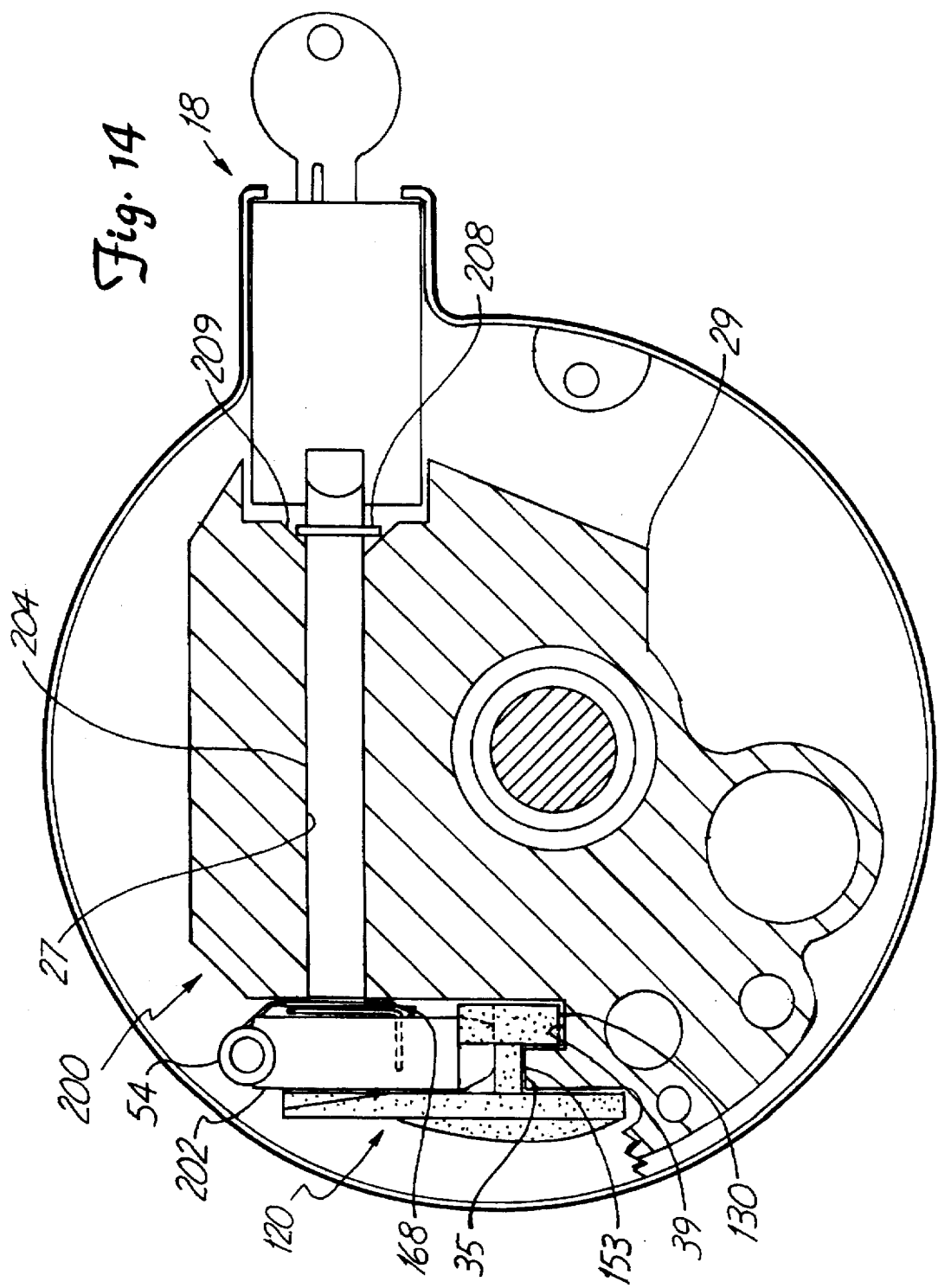
FIG. 14 is a schematic sectional view of the steering column with a side elevational view of a sector gear/shaft assembly of the present invention and a front view of the ignition rack of the second embodiment.

FIGS. 14 and 15 illustrate a unitary sector gear/shaft assembly 200. The sector gear/shaft assembly 200 is made of a suitably strong material such as plastic, silicon brass or stainless steel, and includes a sector gear portion 202 similar to the sector gear 122 described above. Preferably, the sector gear portion 202 is made integral with the shaft portion 204; however if desired, the sector gear portion 202 and the shaft portion 204 can be made separately and then suitably joined to provide a single structure prior to installation in the inner structure 29 of the steering column 10. For example, the sector gear portion 202 can include an aperture similar to aperture 178. The shaft portion 204 would then be secured within the aperture 178 for example by gluing.

The sector gear/shaft assembly 200 is held in place by a remote end of the shaft portion 204 away from the sector gear portion 202. In the embodiment illustrated, the shaft portion 204 includes an annular groove 206 that accepts a suitable fastener such as a snap ring 208 once the shaft portion 204 of the sector gear/shaft assembly 200 has been inserted in and through the aperture 27 of the inner structure 29. Preferably, the annular groove 206 is positioned on the shaft portion 204 so that it coincides with a small annular recess 209 typically present about the opening of the aperture 27 near the key receiving assembly 18. By disposing the annular groove 206 within the recess 209, this positions the snap ring 208 also substantially within the recess 209 as illustrated in FIG. 14. Location of the snap ring 208 within the recess 209 is preferred because once the snap ring 208 has been joined to the shaft portion 204 to secure the sector gear/shaft assembly 200 to the inner structure 29, it is very difficult to remove the snap ring 208. The end of the shaft portion 204 has a known configuration so as to couple to the key receiving assembly 18 positioned on the right side of the steering column 10. The snap ring 208 is protected by the key receiving assembly 18 when the steering column 10 is assembled.

The present invention provides an improved ignition rack and an improved sector gear that can be easily installed into vehicles currently on the road, or can be part of steering columns for future vehicles. The improved ignition rack is made of a material substantially stronger than diecast materials and includes a guard flange to inhibit removal of a sector gear. When formed with a reinforced inner hardened core structure and a solid head portion having an outer curved or domed surface, the ignition rack further resists breakage. The sector gear has a flat outer surface facing the guard flange of the ignition rack. In addition, the sector gear protects a spring from attack.

Although the present invention has been described with reference to preferred embodiments, and in particular to a tilt steering column, workers skilled in the art will recognize that the present invention is adaptable to non-tilt steering columns, and that changes may be made in form and detail without departing from the spirit and scope of the invention.

What is claimed is:

1. A steering column having a steering shaft for turning wheels of a vehicle, the vehicle having an electrical switch mounted therein, the steering column comprising:

an inner structure;

a locking bolt slidably disposed in the inner structure to selectively lock rotation of the steering shaft;

a key receiving assembly disposed on the inner structure and rotatable to a locked position wherein the steering shaft is locked;

a sector gear receiving an end of the locking bolt in a recess and having teeth disposed on a side of the inner structure opposite the key receiving assembly and having an integral shaft portion extending through an aperture in the inner structure and coupled to the key receiving assembly;

a separate fastener secured to an end of the shaft portion remote from the teeth that prevents axial displacement of the shaft portion from the key receiving assembly out of the aperture, said fastener having an outer diameter greater than the diameter of the shaft portion between the fastener and the sector gear; and an ignition rack having a longitudinal member with teeth thereon mating with the teeth of the sector gear, the ignition rack being linearly displaceable with rotation of the sector gear and coupleable to the electrical switch to operate the electrical switch.

2. The steering column of claim 1 wherein the shaft portion has an annular groove disposed on the end remote from the teeth, wherein the fastener is disposed in the annular groove.

3. The steering column of claim 2 wherein the fastener comprises a snap ring.

4. A kit for a steering column in a vehicle to operate an electrical switch and a steering wheel locking bolt mounted in the vehicle, the vehicle having an inner structure and a key receiving assembly rotatably mounted to the inner structure proximate an aperture extending through the inner structure to a surface opposite the key receiving assembly, the kit comprising:

a sector gear having a recess for receiving an end of the locking bolt and having teeth disposable on a side of the inner structure opposite the key receiving assembly and having an integral shaft portion extendable through the aperture in the inner structure and coupleable to the key receiving assembly;

a separate fastener securable to an end of the shaft portion remote from the teeth for preventing axial displacement of the shaft portion from the key receiving assembly out of the aperture, said fastener having an outer diameter greater than the diameter of the shaft portion between the fastener and the sector gear; and an ignition rack having a longitudinal member with teeth thereon engageable with the teeth of the sector gear, the ignition rack being linearly displaceable with rotation of the sector gear and coupleable to the electrical switch to operate the electrical switch.

5. The kit of claim 4 wherein the shaft portion has an annular groove disposed on the end remote from the teeth, wherein the fastener is disposable in the annular groove.

6. The kit of claim 4 wherein the fastener comprises a snap ring.

7. A steering column having a steering shaft for turning wheels of a vehicle, the vehicle having an electrical switch mounted therein, the steering column comprising:

an inner structure;

a locking bolt slidably disposed in the inner structure to selectively lock rotation of the steering shaft;

a key receiving assembly disposed on the inner structure and rotatable to a locked position wherein the steering shaft is locked;

a shaft having a first end coupled to the key receiving assembly to rotate with the key receiving assembly, wherein the shaft extends into the inner structure;

a sector gear disposed on a side of the inner structure opposite the key receiving assembly and coupled to a second end of the shaft to rotate with the shaft to control movement of the locking bolt, the sector gear having teeth located on a portion of an outer perimeter; and an ignition rack comprising:

a longitudinal member with teeth thereon mating with the teeth of the sector gear, the ignition rack being linearly displaceable with rotation of the sector gear and coupled to the electrical switch to operate the electrical switch; and a guard flange disposed on the longitudinal member to limit axial displacement of the sector gear on the shaft away from the inner structure when the key receiving assembly is in the locked position.

8. The steering column of claim 7 wherein the guard flange has a flat surface facing the sector gear.

9. The steering column of claim 8 wherein the guard flange has a curved surface on a side opposite the flat surface.

10. The steering column of claim 7 wherein the longitudinal member comprises an inner core made of a first material and an outer member made of a second material.

11. The steering column of claim 10 wherein the inner core is encased within the outer member.

12. The steering column of claim 7 wherein the longitudinal member has an end, the teeth of the longitudinal member being positioned proximate the end; and wherein the longitudinal member includes an enlarged head portion on an end opposite the first-mentioned end and a slot extending between the enlarged head portion and the first-mentioned end.

13. The steering column of claim 12 and further comprising an outer casing disposed about the inner structure and wherein the enlarged head portion has a first surface facing the inner structure and a second surface, on a side opposite the first surface, facing an inner wall of the outer casing, the first surface having an arcuate channel formed therein.

14. The steering column of claim 13 wherein the second surface of the enlarged head portion comprises an outer curved surface.

15. A steering column having a steering shaft for turning wheels of a vehicle, the vehicle having an electrical switch mounted therein, the steering column comprising:

an inner structure;

an outer casing disposed about the inner structure;

a switch rod having a first end coupleable to the electrical switch and a second end;

a rotatable key receiving assembly disposed on the inner structure;

a shaft having a first end coupled to the key receiving assembly to rotate with the key receiving assembly, wherein the shaft extends into the inner structure;

a sector gear disposed on a side of the inner structure opposite the key receiving assembly and coupled to a second end of the shaft to rotate with the shaft, the sector gear having teeth located on a portion of an outer perimeter; and an ignition rack having a longitudinal member with teeth thereon mating with the teeth of the sector gear, the ignition rack being linearly displaceable with rotation of the sector gear and an enlarged head portion connected to an end of the longitudinal member, the enlarged head portion having a first surface facing the inner structure and the steering shaft, and a second surface, on a side opposite the first surface, facing an inner wall of the outer casing, the first surface having a channel formed therein opening only to the first surface, wherein the channel receives the second end of the switch rod.

16. The steering column of claim 15 wherein the first surface of the enlarged head portion comprises a planar surface and the second surface comprises a curved surface.

17. A kit for a steering column in a vehicle to operate an electrical switch and a steering wheel locking bolt slidably mounted in the steering column, the vehicle having a key receiving assembly rotatably mounted on the steering column and a shaft with a first end joined to the key receiving assembly for rotation therewith and a second end, the kit comprising:

a sector gear having an aperture on a first surface for receiving the second end of the shaft and a second surface formed on a side opposite the first surface wherein a portion of the second surface extends beyond an annular edge of the first surface and with an interconnecting shoulder form a recess, the sector gear having teeth located on a portion of an outer perimeter; and an ignition rack having teeth for meshing with the teeth of the sector gear and a guard flange extending above the teeth of the ignition rack.

18. The kit of claim 17 wherein the aperture of the sector gear opens only to the first surface.

19. The kit of claim 18 wherein the second surface is flat.

20. A steering column having a steering shaft for turning wheels of a vehicle, the vehicle having an electrical switch mounted therein, the steering column comprising:

an inner structure;

a locking bolt slidably disposed in the inner structure to selectively lock rotation of the steering shaft;

a key receiving assembly disposed on the inner structure and rotatable to a locked position wherein the steering shaft is locked;

a shaft having a first end coupled to the key receiving assembly to rotate with the key receiving assembly, wherein the shaft extends into the inner structure;

a sector gear disposed on a side of the inner structure opposite the key receiving assembly and coupled to a second end of the shaft through an aperture on a first surface facing the inner structure to rotate with the shaft, the sector gear having a second surface formed on a side opposite the first surface and facing away from the inner structure wherein a portion of the second surface extends beyond an annular edge of the first surface and with an interconnecting shoulder form a recess for an end of the locking bolt, the sector gear including teeth located on a portion of an outer perimeter; and an ignition rack having a longitudinal member with teeth thereon mating with the teeth of the sector gear, the ignition rack being linearly displaceable with rotation of the sector gear and coupled to the electrical switch to operate the electrical switch.

21. The steering column of claim 20 wherein the aperture of the sector gear opens only to the first surface.

22. The steering column of claim 21 wherein the second surface is flat.

23. The steering column of claim 20 wherein the ignition rack includes a guard flange disposed on the longitudinal member to limit axial displacement of the sector gear on the shaft away from the inner structure when the key receiving assembly is in the locked position.

24. The steering column of claim 20 and further comprising an outer casing disposed about the inner structure and a switch rod having a first end coupleable to the electrical switch and a second end, and wherein the ignition rack includes an enlarged head portion connected to an end of the longitudinal member, the enlarged head portion having a first surface facing the inner structure and a second surface, on a side opposite the first surface, facing an inner wall of the outer casing, the first surface having a channel formed therein, wherein the channel receives the second end of the switch rod.

* * * * *